United States Patent [19]

Bloom

[11] Patent Number: 5,064,969
[45] Date of Patent: Nov. 12, 1991

[54] JUNCTION BOX COVER WITHOUT METALLIC PARTS

[75] Inventor: Myron G. Bloom, Santa Ana, Calif.

[73] Assignee: Masco Building Products Corp., Taylor, Mich.

[21] Appl. No.: 531,253

[22] Filed: May 31, 1990

[51] Int. Cl.⁵ .............................................. H02G 3/18
[52] U.S. Cl. ....................................................... 174/67
[58] Field of Search ................... 174/48, 67; 220/242; 439/142

[56] References Cited

U.S. PATENT DOCUMENTS

| | | | |
|---|---|---|---|
| 1,434,971 | 11/1922 | Thomas | 220/242 X |
| 1,455,399 | 5/1923 | Keavaney | 220/242 |
| 3,621,115 | 11/1971 | Kolster | 220/242 |
| 3,811,004 | 5/1974 | Moore | 220/242 X |
| 3,956,573 | 5/1976 | Myers et al. | 174/48 |
| 4,237,666 | 12/1976 | Kohaut | 52/221 |
| 4,443,654 | 4/1984 | Flachbarth et al. | 174/48 |
| 4,770,643 | 9/1988 | Castellani et al. | 174/48 X |

Primary Examiner—Leo P. Picard
Assistant Examiner—David A. Tone
Attorney, Agent, or Firm—Poms, Smith, Lande & Rose

[57] ABSTRACT

The present invention discloses a junction box cover without any metallic parts. The junction box cover includes a one-piece, non-metallic face plate with a generally flat upper surface and at least one cutout adapted to reveal an electrical receptacle. A non-metallic receptacle cap is shaped to fill and cover the cutout with a pivot at one end thereof for mounting the cap flush with the upper surface of the face plate when in a closed position, and for exposing the receptacle when the cap is in a open position. A non-metallic retaining bar is utilized to secure the pivot of the cap to the face plate and to provide a retaining pressure for maintaining the cap in an open position.

9 Claims, 2 Drawing Sheets

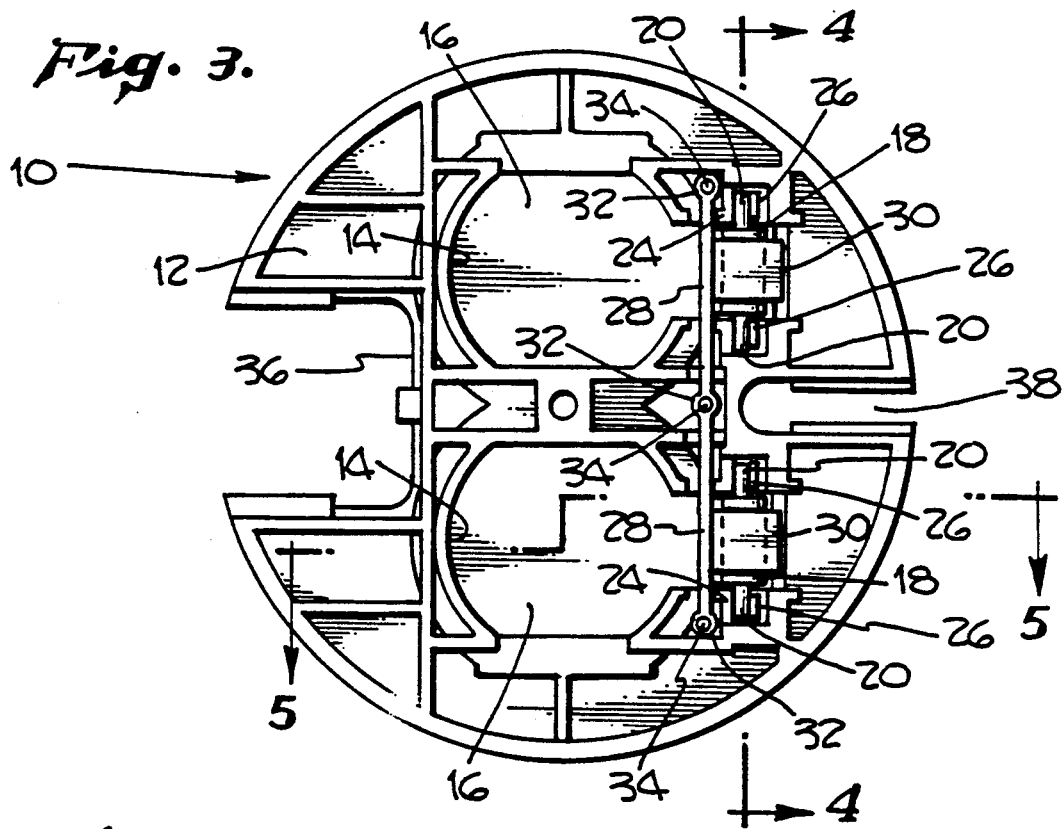
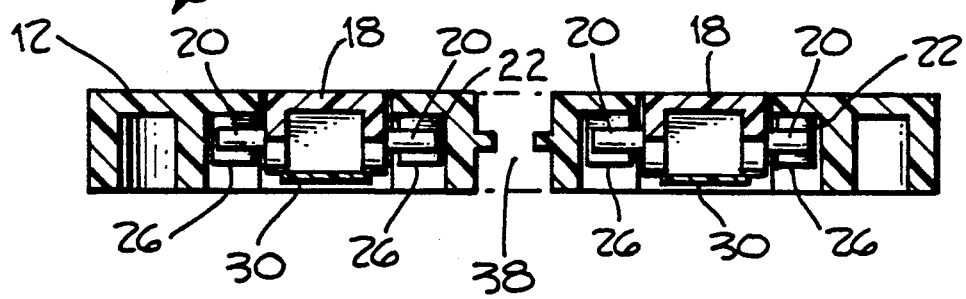
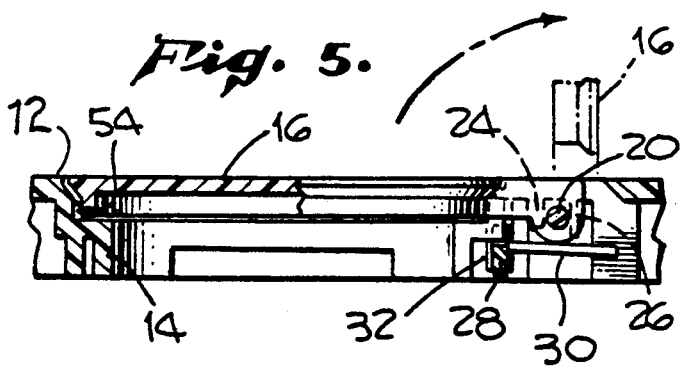
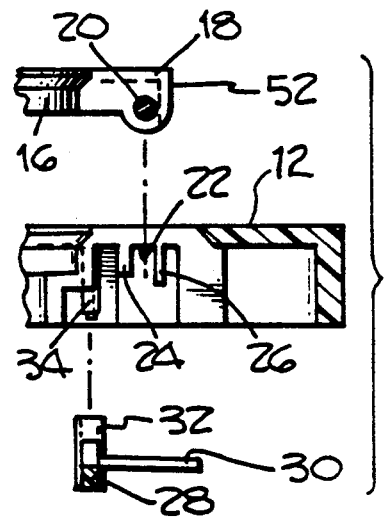

JUNCTION BOX COVER WITHOUT METALLIC PARTS

BACKGROUND OF THE INVENTION

1. Field of the Invention

The present invention relates to covers for electrical junction boxes and, more particularly, to a junction box cover which has no metal parts.

2. Description of the Related Art

This application is related to copending U.S. Pat. application, Ser. No. 483,092, filed on Feb. 20, 1990, which is assigned to the same assignee as the present invention. U.S. Pat. application Ser. No. 483,092 describes a poke-through connector assembly for use within an aperture bored in a concrete floor and for providing an electrical receptable in the floor.

Modern, high-rise buildings, such as office buildings, apartment complexes, condominiums and other structures, are typically built from a skeletal steel structure wherein the steel beams forming the structure are interconnected by rivets, bolts or other fasteners. The steel beams that form the floors of the structure are typically covered with corrugated steel plates upon which concrete may be poured. Alternately, reinforced concrete may be poured without the use of the plates. The poured floors provide a resistance to the spread of heat that could ignite materials on an upper floor from a fire on a floor below.

One problem with maintaining the fire rating of the poured concrete floors is the need to establish electrical wiring therebetween. This wiring may be established by boring an aperture through the floor and inserting a floor connector or receptacle therein. The floor receptacles inserted through the concrete floor must be constructed to maintain the fire rating of the poured concrete floor. Some floor receptacles have ignored this problem; see, for example, U.S. Pat. No. 3,646,244. Other receptacles, such as the one described in U.S. Pat. application Ser. No. 483,092, recognize the importance of maintaining the fire rating of a concrete floor.

One important factor in increasing the fire rating of a floor connector is the elimination of metal components in the connector and its associated hardware. The heat conducting ability of most metals makes them an unsatisfactory material for increasing the fire rating of a floor connector. Other junction box covers may be fabricated from a multiplicity of parts making them more expensive and complex to manufacture.

SUMMARY OF THE INVENTION

Accordingly, it is an object of the present invention to provide a junction box cover with an improved fire rating by eliminating all metal parts therein.

Another object is to provide a junction box cover that is manufactured from fewer individual parts.

In accomplishing these and other objects, there is provided a junction box cover assembly with a non-metallic face plate having a generally flat upper surface and a cutout adapted to expose an electrical receptacle. A non-metallic receptacle cap is shaped to fit within the cutout and is pivoted at one end for mounting the cap flush with the upper surface of the face plate when in a closed position and for exposing the receptacle when in an open position. A non-metallic retaining member is utilized to secure the cap to the face plate and to retain the cap when it has been pivoted into an open position.

DESCRIPTION OF THE DRAWINGS

Other Objects and advantages of the present invention will be better understood after a careful consideration of the following specification and drawings, wherein:

FIG. 3 is a bottom view of the junction box cover;

FIG. 4 is a cross-sectional view taken along line 4—4 of FIG. 3;

FIG. 5 is a cross-sectional view taken along line 5—5 of FIG. 3; and

FIG. 6 is a detail view of a pressure plate, a pivot, and a portion of the face plate similar to FIG. 5.

DESCRIPTION OF THE PREFERRED EMBODIMENT

Figure 1:
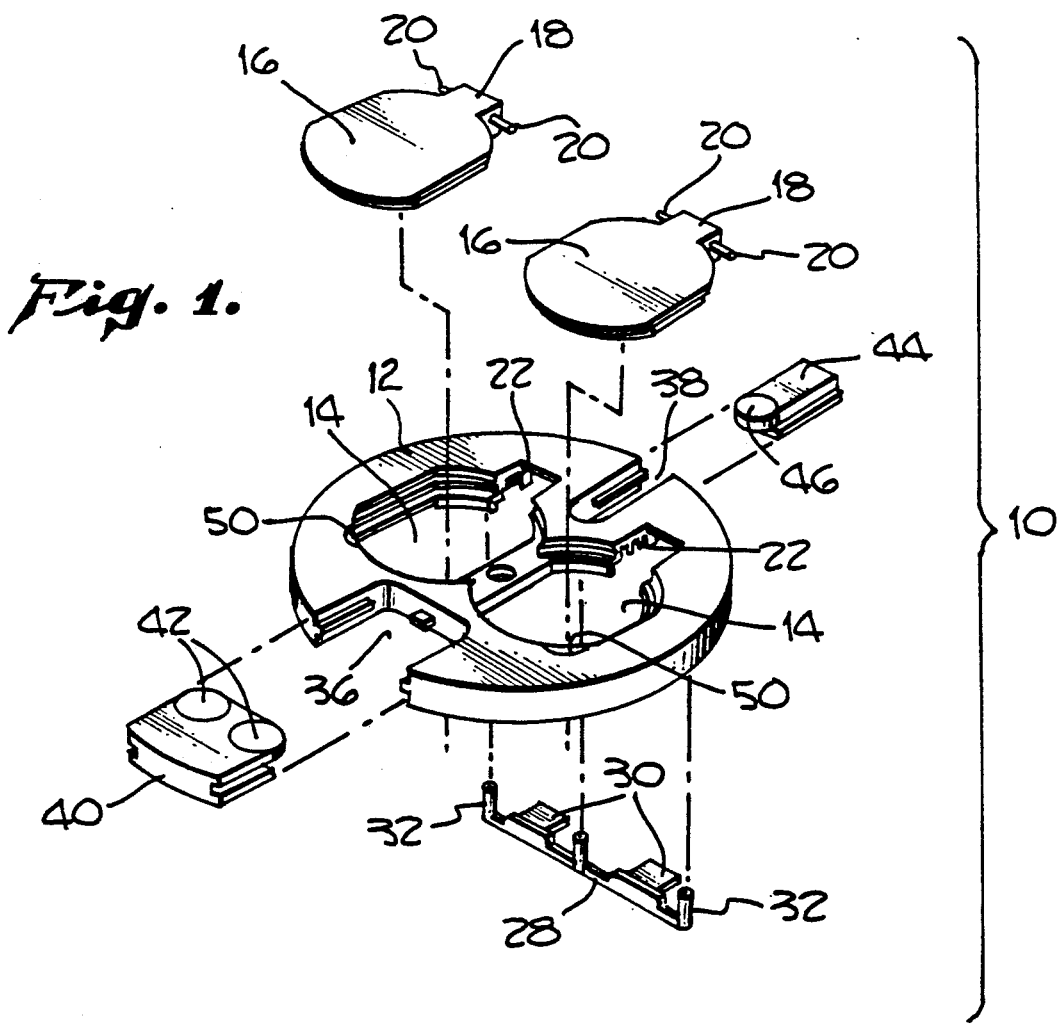
FIG. 1 is an exploded view of a junction box cover of the present invention.
Figure 2:
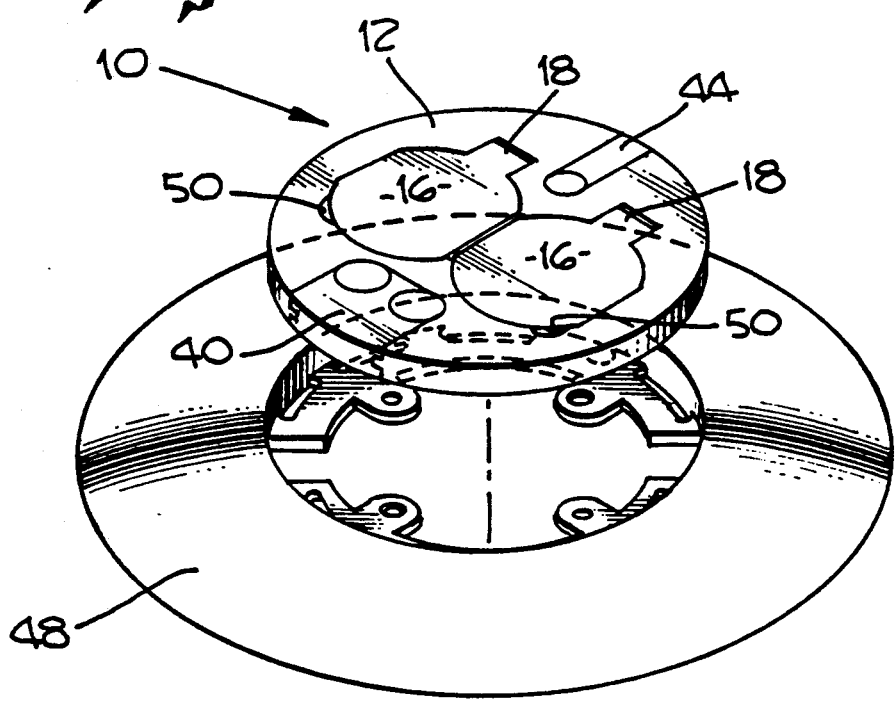
FIG. 2 is a perspective view of the junction box cover exploded from a carpet ring.

Referring now to the drawings, FIG. 1 shows an exploded view of a junction box cover without metallic parts indicated generally as 10. A disc shaped, single-piece, non-metallic face plate 12 with a generally flat upper surface is shown with cutouts 14 adapted to expose an electrical receptacle, not shown. Receptacle caps 16 are shown having a generally circular configuration with an extended pivot 18 at one end thereof. The pivots 18 included two small axles or pin-like appendages 20 extending from each side of pivot extension 18. In some prior art covers, the plate 12 is made of two pieces split along a plane parallel to the flat upper surface of plate 12 and passing through the axles 20. Each pivot 18 and its axles 20 fit into the slots 22 on the lower surface of the face plate 12, as seen in FIGS. 3 and 6. The caps 16 are configured to mount flush with the upper surface of the face plate 12 when in a closed position as seen in FIG. 2. Slots 22 are formed by a rib portion 24 of plate 12 and an extending spring finger 26, as best seen in FIGS. 4 and 6.

A non-metallic retaining bar 28 secures the pivot 18 of each cap 16 to the face plate 12. The retaining bar 28 is provided with a pair of extending pressure plates 30 which apply pressure to the end of each cap 16 at the curved outer edge of the pivot 18, as seen in FIG. 5. This pressure is for maintaining each cap 16 in an open position within cutouts 14.

The retaining bar 28, shown in FIG. 1, is a strip of plastic material having three cylindrical extensions or locking rings 32 with the two pressure plates 30 therebetween. The retaining bar 28 is secured to the face plate 12 by placing the looking rings 32 onto a set of locking fingers 34 located on the bottom surface of the face plate 12, FIG. 6. The locking rings 32 fit over the locking fingers 34 and snap securely into place, as seen in FIG. 3 and 6. Alternately, the fingers 34 may be expanded by heat once the rings 32 are in place to retain the bar 28 or the bar 28 will be retained by the presence of the carpet ring 48. Once snapped into place, the retaining bar 28 confines the pivots 18 of the caps 16 into the pivot slots 22, as seen in FIGS. 3 and 4. The pressure plates 30 apply pressure to the bottom of the caps 16 at pivot extension 18 and hold the caps when pivoted into an open position.

FIG. 1 shows the junction box cover 10 further including a dual signal wire cutout 36 and a single, signal wire cutout 38. The dual, signal wire cutout 36 provides an opening for two signal wire cables and their end connectors or for a telephone cable, not shown. Likewise, single, signal wire cutout 38 provides an opening for a single cable, also not shown. A dual cover 40 slides into the dual, signal wire cutout 36 to provide a cover flush with the upper surface of the face plate 12 after the cables have been installed. It will be seen that the dual cover 40 has two knockouts 42 that may be removed to accommodate the cables. Likewise, a single cover 44 may be slid into place in cutout 38 which is also provided for the knockout 46 to accommodate a wire cable.

A carpet ring 48, shown in FIG. 2, is formed to fit between the face plate 12 and the receptacle or junction box (not shown). Carpet ring 48, in a preferred embodiment, provides a smooth transition from the floor to the top surface of the face plate 12. As seen in FIGS. 1 and 2, plate 12 has crescent relief areas 50 to permit a user to lift the caps 16 by insertion of a fingernail, for example.

The pivots 18 of the caps 16 are shaped such that the caps 16 rotate about the axles 20 which are confined to the slots 22 in the bottom of the face plate 12 when moving from a closed to an open position. The pivots 18 are rounded on the portion thereof for contact on the pressure plates 30 during their movement. This provides for a smooth and secure opening and closing movement of the caps 16 indicated by the arrow in FIG. 5. When the caps 14 are in the opened position, a flat surface 52 on the pivot 18, FIG. 6, is in contact with the pressure plate 30. The flat pressure plate 30 pressing against the flat surface 52 holds the cap 16 in the open position.

In the closed position, the left-hand end of the cap 16 engages a set of small detents 54, FIG. 5, which force each cap 16 back against the spring fingers 26. The yielding of spring fingers 26 thus retain the cap 16 in the closed position.

It will be understood that configurations other than those shown for the various components are possible. Other patterns for the cutouts and corresponding caps and covers may be utilized. All the components of the junction box cover are preferably made of a material sold under the trademark, Lexan 940R. However, other suitable flame resistant materials might be used. Therefore, the present invention should not be limited by the foregoing description of the preferred embodiment.

What is claimed is:

1. A junction box cover without metallic parts for use with an electrical receptacle, comprising:
   a non-metallic face plate with a generally flat upper surface, a lower surface, and a cutout adapted to expose said electrical receptacle;
   a non-metallic receptacle cap shaped to fill and cover said cutout which exposes said electrical receptacle, said cap having a pivot at one end for mounting said cap flush with the upper surface of said face plate when in a closed position and for exposing said receptacle when in an open position; and
   a non-metallic retaining means for securing said pivot of said cap to said face plate and for retaining said cap in said open position.

2. The junction box cover defined in claim 1, additionally comprising:
   said face plate having a plurality of signal wire connector cutouts; and
   signal wire connector covers adapted to cover the signal wire connector cutouts, said covers being flush with said upper surface of said face plate.

3. The junction box cover defined in claim 1, additionally comprising:
   a carpet ring formed to fit beneath said face plate.

4. The junction box cover defined in claim 1, additionally comprising:
   locking fingers extending from the lower surface of said face plate; and
   locking rings on said retaining means whereby said retaining means is secured to said face plate by inserting said locking fingers into said locking rings.

5. A floor mounted junction box cover without metallic parts for use with a poke through connector having a plurality of electrical receptacles comprising:
   a non-metallic face plate with a generally flat upper surface and a plurality of cutouts adapted to reveal said electrical receptacles;
   non-metallic receptacle caps shaped to cover said cutouts which expose said electrical receptacles, said caps having a pivot at one end for mounting said caps flush with the upper surface of said face plate when in a closed position and for pivoting said caps to expose said receptacle when in an open position; and
   a non-metallic retaining means for securing said pivot end of said caps to said face plate and for retaining said caps in said open position.

6. The junction box cover defined in claim 5, additionally comprising:
   a carpet ring formed to fit beneath said face plate, surround said face plate, and create a smooth transition between said face plate and said floor.

7. The junction box cover defined in claim 5 additionally comprising:
   locking fingers extending from the lower surface of said face plate; and
   locking rings on said retaining means whereby said retaining means is secured to said face plate by inserting said locking fingers into said locking rings.

8. The junction box cover defined in claim 5, additionally comprising:
   said face plate having a plurality of signal wire connector cutouts; and
   signal wire connector covers adapted to cover the signal wire connector cutouts, said covers being flush with said upper surface of said face plate.

9. The junction box cover defined in claim 5, additionally comprising:
   said non-metallic receptacle caps having a pivot extending from each cap and a pair of axles extending from each pivot;
   said non-metallic face plate having a set of slots therein for receiving said axles, and
   aid slots formed by a plurality of spring fingers for retaining said caps in said closed positions.

* * * * *